United States Patent [19]

Urano et al.

[11] Patent Number: 5,480,584
[45] Date of Patent: Jan. 2, 1996

[54] METHOD FOR DUST-CONTROL TREATMENT

[75] Inventors: Teruo Urano, Sano; Hiroshi Miyaji, Utsunomiya; Masatsune Ogura, Ichikawa; Tetsuya Shimoda, Hachioji; Katuaki Ishikawa, Yokohama, all of Japan

[73] Assignees: Murakashi Lime Industry Co., Ltd.; Nippon Hodo Co., Ltd.; Dupont-Mitsu Fluorochemicals Co., Ltd., Japan

[21] Appl. No.: 427,856

[22] Filed: Apr. 26, 1995

Related U.S. Application Data

[63] Continuation of Ser. No. 215,680, Mar. 22, 1994, abandoned, which is a continuation of Ser. No. 933,686, Aug. 24, 1992, abandoned, which is a division of Ser. No. 247,606, Sep. 22, 1988, abandoned.

[30] Foreign Application Priority Data

Sep. 24, 1987 [JP] Japan .................... 62-237422
Sep. 24, 1987 [JP] Japan .................... 62-237423

[51] Int. Cl.$^6$ ........................................... C09K 3/00
[52] U.S. Cl. .................. 252/384; 71/64.07; 427/221; 524/414; 524/415; 524/423; 524/424; 524/425; 524/433; 524/436
[58] Field of Search ............... 71/64.07; 427/221; 252/384; 524/414, 415, 423, 424, 425, 433, 436

[56] References Cited

U.S. PATENT DOCUMENTS 4,767,800  8/1988  Nev et al. .................... 523/141

OTHER PUBLICATIONS

Rahl, et al., Studies of the Morphology of Emusion–Grade Polytetrafluoroethylene; Journal of Polymer Science, Part A–2, vol. 10, pp. 1337–1349, (1972).
Kirk–Othmer, Encyclopedia of Chemical Technology; 2nd Edition, vol. 9, pp. 812–814.

*Primary Examiner*—Peter D. Mulcahy
*Attorney, Agent, or Firm*—Cushman Darby & Cushman

[57] ABSTRACT

Dust-control treatment of dusty powder, which mainly passes through a 100 mesh sieve, such as pigment and fertilizer, is achieved by, firstly blending the dusty powder with fibrillatable polytetrafluoroethylene and a pair of materials capable of initiating an exothermic reaction upon contact, and then subjecting the blended material to compression-shear under the exothermic reaction and raising the temperature of the blended material to 50–300° C. The polytetrafluoroethylene fibrillates during the compression-shear and the formed fibrils enclose the dusty powder to turn it to a dust-controlled one.

1 Claim, No Drawings

METHOD FOR DUST-CONTROL TREATMENT

This is a continuation of application Ser. No. 8,215,680, filed on Mar. 22, 1994, which was abandoned upon the filing hereof; which was a continuation of 07/933,686, filed Aug. 24, 1992, now abandoned; which was a division of 07/247,606 filed Sept. 22, 1988, now abandoned.

FIELD OF THE INVENTION

The present invention relates to a dust-control agent for dusty powder and a method for dust-control treatment.

DESCRIPTION OF THE PRIOR ART

It has been known that a kind of polytetrafluoroethylene (referred as PTFE hereinafter) forms ultra fine cobweb-like fibrils under compressionsshear at an appropriate temperature.

In Japanese Patent Publication Tokko Sho 52-32877 (corresponding to U.S. Pat. No. 3,838,064), it has been disclosed a method for dust-control treatment wherein an effective quantity of fibrillatable PTFE powder is added to dusty powder under compression-shear by agitation at a temperature of about 20° to 200° C.

Fibrillation of PTFE is said to start at about 20° C. However, in practical industrial purposes, it is desirable to give compression-shear at a temperature above 50° C., preferably above 80° C. Accordingly, when the temperature of the dusty powder is low, it is required to heat it to a temperature above 80° C., requiring enough heat energy and a heating apparatus.

In Japanese Patent Provisional Publication Tokkai Sho 60-191084, it has been proposed a manufacturing method of slaked lime fertilizer with anti-flux property whose particles are covered and coagulated with cobweb-like net wherein quick lime is added with fibrillatable PTFE powder dispersed in a certain quantity of water necessary to hydrate the quick lime and given a compression-shear by agitation at an elevated temperature caused by an exothermic hydration reaction of the quick lime and the water.

Such method can be applied to a material such as quick lime which can make an exothermic reaction itself, but it cannot be applied to an optional dusty powder which cannot make an exothermic reaction itself in order to give necessary heat to elevate the temperature of it to a degree suitable to fibrillate PTFE.

SUMMARY OF THE INVENTION

It is an object of the present invention to provide a dust-control agent easily applicable to any kinds of dusty powder and a method for dust-control treatment of dusty powder.

The present invention provides a dust-control agent comprising a mixture of fibrillatable PTFE and a material in a state of solid grain or powder selected out of a pair of two kinds of materials which interact each other to make an exothermic reaction.

The method for dust-control treatment of dusty powder of the present invention comprises blending a dusty powder, fibrillatable PTFE and a pair of two kinds of materials which interact each other to make an exothermic reaction, and giving the blended materials a compression-shear at an elevated temperature caused by the exothermic reaction between the pair of two kinds of materials to fibrillate the fibrillatable PTFE and enclose the dusty powder with fibrils of the PTFE.

The dusty powder can be dust-controlled being enclosed with cobweb like ultra fine PTFE fibrils without any external heat energy because the heat generated by a reaction between the pair of two kinds of materials which interact each other to make an exothermic reaction elevates the temperature to a degree to promote the fibrillation of PTFE.

DETAILED DESCRIPTION OF THE PREFERRED EMBODIMENTS

Representative fibrillatable PTFE can be obtained by a method disclosed by Barry in U.S. Pat. No. 2,559,752 wherein tetrafluoroethylene monomer is polymerized in an aqueous medium containing fluorocarbon surfactant.

PTFE particle obtained by the above mentioned method is a colloidal particle having a particle size in a range of 0.05–0.5 micron and a surface area above 10 $m^2$/g. It can be obtained in a form of an aqueous dispersion or in a form of powder coagulated from said aqueous dispersion and either of which can be used in the present invention.

As the exothermic reaction between a pair of two kinds of materials, a hydration reaction and an oxidation reaction are representative reactions.

When the exothermic reaction between a pair of two kinds of materials is hydration reaction, one side of the two kinds of materials is a material to be hydrated, for example, alkaline earth metal oxide, alkaline earth metal peroxide, calcium carbide, calcium phosphide, calcium aluminate, calcium silicate, gypsum or a mixture of these materials and another side of the two kinds of materials is water or an aqueous solution.

It is the former materials that are used as a component of the dust-control agent of the present invention. They are used in a state of solid grain or powder due to the convenience of mixing and dispersing and advancement of reactivity. When hydrated, they generate a heat of reaction necessary to elevate the temperature of materials containing them to a level required to fibrillate PTFE easily. Furthermore, they are preferable because they promote the fibrillation of PTFE due to their expansion of volume and reduction to powder in the course of hydration.

The choice of above said materials depends on their compatibility with the dusty powder to be dust-controlled, availability and economical viewpoint. Among them, alkaline-earth metal oxide such as MgO, CaO, SrO, BaO, or a combination of these materials, for example, calcined dolomite (CaO+MgO) may be preferably used.

When the exothermic reaction between a pair of two kinds of materials is oxidation reaction, one side of the two kinds of materials is a material to be oxidized, for example, metallic powder such as Fe, Al, Mg, Cu or a mixture of these powder and another side of the two kinds of materials is an oxidizer such as oxygen, peroxide, perchlorate or a mixture of these materials. When both of them are in a state of solid grain or powder, either of which may be used as a component of the dust-control agent of the present invention.

When a dusty powder is treated with fibrillated PTFE, proper quantity of PTFE to be used for dust-control might be affected by the particle size, specific gravity, moisture contents etc. of the dusty powder. Generally speaking, the quantity of PTFE corresponding to 0,005 to 1 weight percent of the quantity of dusty powder is preferable. Accordingly, the concentration of PTFE in the dust-control agent of the present invention must be higher than 0,005 to 1 weight percent.

From another point of view, the quantity of a material in a state of solid grain or powder selected out of a pair of two kinds of materials which interact each other to make an exothermic reaction is requested to be enough to raise the temperature of a mixture of the dust-control agent and dusty powder to 50–300° C., preferably 80–200° C.

Accordingly, the proper blending ratio of PTFE to the said material in a state of solid grain or powder can be decided by calculation. It would be between 0.01 and 10 weight percent, although it might be affected by the calorific value per unit weight of those materials.

Assuming a case wherein a hydration reaction of the dust-control agent is utilized to elevate the temperature for dust-control treatment of 100 mesh pass dusty powder such as ferrite, dust collected during steel production process, asphaltite, special type cement for soil conditioning, calcium silicate type fertilizer, calcium carbonate type fertilizer, an example of a dust-control agent using quick lime (CaO) as a material in a state of solid grain or powder selected out of a pair of two kinds of materials which interact each other to make an exothermic reaction is explained hereunder.

In order to elevate the temperature of the total mass of the quick lime and a dusty powder to be dust-controlled from ordinary temperature to above 80° C., it is required that the ratio of the quantity of the quick lime to the total quantity of the quick lime and the dusty powder is 20–30 weight percent.

When the ratio of the quantity of PTFE to the total quantity of the quick lime and the dusty powder is chosen to be in a range of 0.05–0.1 weight percent, the concentration of PTFE in the mixture of PTFE and the quick lime should be 0.17–0.5 weight percent.

It is preferable that the material in a state of solid grain or powder selected out of a pair of two kinds of materials which interact each other to make an exothermic reaction has been pulverized so as to pass through 5 mm sieve, preferably to pass through 2 mm sieve, to attain an uniform distribution of PTFE in the material.

As mentioned above, either of marketed fibrillatable PTFE in a form of dry powder with average particle size of about 500 micron or fibrillatable PTFE in a form of an aqueous dispersion may be used for the present invention, but the aqueous dispersion type is more preferable from the viewpoint of dispersibility.

When an aqueous dispersion type fibrillatable PTFE and the material to be hydrated are blended, the latter is partially hydrated to hydroxide by water contained in the aqueous dispersion and a part of PTFE is fibrillated by the hydration heat, which means that there is another advantage that the dust-control agent itself will be dust-controlled.

At the dust-control treatment of dusty powder using the dust-control agent of the present invention, the dust-control agent is blended with the dusty powder under compression-shear. In this stage, PTFE was not enough fibrillated due to lower temperature. Then another kind of material belonging to the pair of two kinds of materials which interact each other to make an exothermic reaction and has not been used for the dust-control agent, water in the case wherein the exothermic reaction is hydration for example, is added to the mixture of the dusty powder and the dust-control agent under agitation and an exothermic reaction of the dust-control agent starts and elevates the temperature of the mixture of the dusty powder and the dust-control agent. In this stage, PTFE in the dust-control agent fibrillates and encloses the dusty powder with ultra fine cobweb-like fibrils. Thus the dusty powder is dust-controlled.

When the reaction between the two kinds of materials which interact each other to make an exothermic reaction is hydration and the dusty powder is dry, it is necessary to supply water externally to hydrate the material in the dust-control agent at the time of dust-control treatment of the dusty powder. On the contrary, if the possible dusty powder contains water in it such as the case of filter cake or dehydrated sludge, it is not necessary to supply external water, because water contained in the filter cake or sludge is absorbed into the material to be hydrated to form hydroxide. In such a case, not only the dust-control treatment of sludge but also its drying proceeds effectively, The composition of the dust-control agent of the present invention may be either a mixture of PTFE powder and a material in a state of solid grain or powder selected out of a pair of two kinds of materials which interact each other to make an exothermic reaction only or a kind of master-blend containing a part of the dusty powder to be dust-controlled together with PTFE powder and a material in a state of solid grain or powder selected out of a pair of two kinds of materials which interact each other to make an exothermic reaction.

The method for dust-control treatment of dusty powder of the present invention also utilizes an exothermic reaction between a pair of two kinds of materials which comprises blending a dusty powder, fibrillatable PTFE and a pair of two kinds of materials which interact each other to make an exothermic reaction, and giving the blended materials a compression-shear at an elevated temperature caused by the exothermic reaction between the pair of two kinds of materials to fibrillate the fibrillatable PTFE and enclose the dusty powder with fibrils of PTFE.

There is no rule of adding order among the dusty powder, PTFE, and the two kinds of materials which interact each other to make an exothermic reaction. All the materials may be blended at the same time or a part of them may be blended in advance. However, when the two materials which interact each other are blended in advance, other materials should be added to them immediately after that.

More practically, following procedures are shown:

1) PTFE and two kinds of materials which interact each other are added to a dusty powder together under agitation.

2) A mixture of PTFE and one of the two kinds of materials which interact each other is blended to a dusty powder, and subsequently the other one of the two kinds of materials is added under agitation.

3) PTFE and a dusty powder are blended in advance and two kinds of materials which interact each other to make an exothermic reaction are added under agitation.

4) A dusty powder and one of the two materials which interact each other to make an exothermic reaction are blended in advance and the mixture of PTFE and the other one of the two materials is added under agitation.

The present invention is explained in detail with examples hereunder, but not limited to them.

Example 1

Preparation of a dust-control agent 1 kg of quick lime pulverized by a hammer crusher to a particle size of 2 mm sieve pass was taken in 2 liters mortar mixer and 140 g of 3 weight percent aqueous dispersion of fibrillatable PTFE (ten times diluted aqueous dispersion of trade name Teflon K20-J: corresponding to 0.42 weight percent of PTFE per the quick lime) were added gradually under agitation of 140 rpm for one minute.

While agitating, a part of the quick lime was converted to slaked lime due to a reaction with water in the aqueous dispersion of PTFE, accompanying some heat generation and the quick lime powder became dust free itself. Thus obtained composition became a dust-control agent.

Dust-control test

To 1 kg of dusty pulverized dolomite lime (particle size: 0.6 mm sieve pass, 1.15mm sieve 90 percent pass) under atmospheric temperature, 0.20kg of above mentioned dust-control agent was blended by a homomixer for one minute. In this stage, PTFE was not enough fibrillated due to lower temperature and the pulverized dolomite lime had never been dust-controlled.

To 1.20Kg of said mixture, 60g of clean water were added under agitation and hydration of the dust-control agent started accompanying the generation of heat. To complete the hydration of quick lime, agitator was stopped for two minutes and the temperature of the mixture was elevated up to 85° C. Then the mixture was agitated again for 10 seconds and obtained 1.20 Kg of powder containing dust-controlled pulverized dolomite lime as a main ingredient. It can be used mainly for soil conditioner, fertilizer or neutralizer etc.

Example 2

Preparation of a Dust-Control Agent

Using 1 kg of light burnt dolomite (main ingredients: CaO 63%, MgO 33%) pulverized by a hammer crusher to a particle size of 2 mm sieve pass was used in place of the quick lime in Example 1, a dust-control agent was prepared by the same procedure as that of Example 1.

Dust-Control Test

To 1 kg of sludge at lime stone washing (filter cake; particle size: 1.00mm sieve oversize 0.02%, 0.3 mm sieve oversize; 0.3%, 0.15 mm sieve oversize 5.5%), 0.3 kg of above mentioned light burnt dolomite type dust-control agent was blended by homomixer as used in Example 1 for one minute. After the temperature of the mixture was elevated to 95° C. on standing, it was agitated again for 30 seconds and fine powder of dehydrated and dust-controlled sludge was obtained. Its moisture content was only 0.1%. It means that drying and dust-control treatment of the sludge were done effectively at the same time.

Example 3

Preparation of a Dust-Control Agent

To 20 g of iron powder of 100 mesh sieve pass in a glass bottle filled in nitrogen atmosphere, 2 g of PTFE powder (trade name: Teflon K10-J) were added and sealed. The glass bottle was placed on a revolving roll to blend the contents of the bottle homogeneously and a dust-control agent was prepared.

Dust-Control Test

Total quantity of the above mentioned dust-control agent, 50 g of dusty powder of ferric oxide (Toda color 140ED), and 20 g of activated carbon impregnated with 10% of aqueous sulfuric acid solution were put in 3 liters autoclave and blended lightly.

After the temperature was elevated to 50° C. on standing for 30 minutes, 450 g of ferric oxide was added further. After close down of the lid of the autoclave, oxygen was supplied from a oxygen bomb to maintain the pressure to 2 kg/cm$^2$G. The autoclave was set on a vibrator and the contents of the autoclave was stirred for 30 minutes, then left to cool. Maximum temperature attained during this procedure was about 100° C. Dust-control effect of the ferric oxide taken out of the autoclave was improved.

Example 4

To 0.8 kg of pulverized blast furnace slag (100 mesh sieve pass), 0.2 kg of pulverized quick lime (2 mm sieve pass) was added and 1 kg of a mixture of them was obtained.

It was put into 2 liters mortar mixer, to which 2 g of PTFE aqueous dispersion containing 30% of resin (corresponding to 0.06 weight percent of PTFE per said mixture) diluted in 80 ml of clean water were added gradually and agitated. 2 minutes after the completion of hydration reaction of quick lime, the temperature reached to 90° C. Then, it was agitated for 10 seconds and 1.06 Kg of dust-controlled powder treated with PTFE fibrils were obtained. Its main applications are soil conditioner, fertilizer etc.

Example 5

To 1 kg of pulverized dolomite lime (particle size: 0.6 mm sieve pass, 0.15mm sieve 90 percent pass) the same as used in Example 1, 175 g of quick lime pulverized by a hammer crusher to a particle size of 2 mm sieve pass were blended, then 60 g of 3 weight percent aqueous dispersion of fibrillatable PTFE (ten times diluted aqueous dispersion of trade name Teflon K20-J) and 60 g of water were added under agitation to make an exothermic reaction. After leaving it about 30 seconds, hydration of the quick lime started with heat generation. To complete the hydration of the quick lime, agitation was stopped for two minutes and the temperature of the mixture was elevated to 85° C. Then it was agitated again for 10 seconds and 1.20 Kg of powder containing dust-controlled pulverized dolomite lime as a main ingredient was obtained.

We claim:

1. In a method for dust control treatment of a dusty powder capable of passing through a 100 mesh sieve by blending the dusty powder with fibrillatable polytetrafluoroethylene and subjecting the blended powder to compression-shear and heating to fibrillate the polytetrafluoroethylene and enclose the dusty powder with fibrils thus formed, the improvement comprises a step of blending the dusty powder with fibrillatable polytetrafluoroethylene, water and a material selected from the group consisting of alkali earth metal oxide, alkali earth metal peroxide, calcium carbide, calcium phosphide, calcium aluminate, calcium silicate and gypsum at ambient temperature and causing exothermic hydration reaction to heat the blended materials to 50–300° C.

* * * * *